(12) United States Patent
Martin

(10) Patent No.: US 6,549,233 B1
(45) Date of Patent: Apr. 15, 2003

(54) COLOR INTERPOLATION SYSTEM

(75) Inventor: Peter N. Martin, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/130,933

(22) Filed: Aug. 7, 1998

(51) Int. Cl.[7] .............................................. H04N 3/14
(52) U.S. Cl. ..................... 348/273; 348/280; 348/282
(58) Field of Search ............................. 348/273, 277, 348/280, 281, 282

(56) References Cited

U.S. PATENT DOCUMENTS

| | | | | |
|---|---|---|---|---|
| 5,373,322 A | * | 12/1994 | Laroche et al. | 348/272 |
| 5,382,976 A | * | 1/1995 | Hibbard | 348/266 |
| 5,506,619 A | * | 4/1996 | Adams et al. | 348/266 |
| 5,596,367 A | * | 1/1997 | Hamilton et al. | 348/266 |
| 5,805,217 A | * | 9/1998 | Lu et al. | 348/266 |
| 5,821,999 A | * | 10/1998 | Barnsley et al. | 348/272 |
| 5,909,242 A | * | 6/1999 | Kobayashi et al. | 348/208 |
| 5,999,636 A | * | 12/1999 | Juang | 250/559.05 |

* cited by examiner

*Primary Examiner*—Wendy R. Garber
*Assistant Examiner*—Matthew L Rosendale
(74) *Attorney, Agent, or Firm*—Trop, Pruner & Hu, P.C.

(57) ABSTRACT

A color interpolation technique may use a Bayer matrix or pattern. In one embodiment, a color intensity gradient may be calculated between data from a center pixel in the Bayer pattern and the sensor spaced from the center pixel. A minimum and maximum gradient for a plurality of pixels may then be determined. Minimum and maximum intensity values for a group of pixel data values may be determined and these may be averaged to determine a value which may be utilized for interpolation purposes. The technique can use only a simple shift and does not require large dividers.

20 Claims, 6 Drawing Sheets

| 0  | 1  | 2  | 3  | 4  |
|----|----|----|----|----|
| 5  | 6  | 7  | 8  | 9  |
| 10 | 11 | 12 | 13 | 14 | Cross
| 15 | 16 | 17 | 18 | 19 |
| 20 | 21 | 22 | 23 | 24 |

*FIG. 1*

| 0  | 1  | 2  | 3  | 4  |
|----|----|----|----|----|
| 5  | 6  | 7  | 8  | 9  |
| 10 | 11 | 12 | 13 | 14 | Celtic
| 15 | 16 | 17 | 18 | 19 |
| 20 | 21 | 22 | 23 | 24 |

*FIG. 2*

Red

| $R_0$ | $G_1$ | $R_2$ | $G_3$ | $R_4$ |
|---|---|---|---|---|
| $G_5$ | $B_6$ | $G_7$ | $B_8$ | $G_9$ |
| $R_{10}$ | $G_{11}$ | $R_{12}$ | $G_{13}$ | $R_{14}$ |
| $G_{15}$ | $B_{16}$ | $G_{17}$ | $B_{18}$ | $G_{19}$ |
| $R_{20}$ | $G_{21}$ | $R_{22}$ | $G_{23}$ | $R_{24}$ |

*FIG. 3*

Green 1

| $G_0$ | $R_1$ | $G_2$ | $R_3$ | $G_4$ |
|---|---|---|---|---|
| $B_5$ | $G_6$ | $B_7$ | $G_8$ | $B_9$ |
| $G_{10}$ | $R_{11}$ | $G_{12}$ | $R_{13}$ | $G_{14}$ |
| $B_{15}$ | $G_{16}$ | $B_{17}$ | $G_{18}$ | $B_{19}$ |
| $G_{20}$ | $R_{21}$ | $G_{22}$ | $R_{23}$ | $G_{24}$ |

*FIG. 4*

Green 2

| $G_0$ | $B_1$ | $G_2$ | $B_3$ | $G_4$ |
|---|---|---|---|---|
| $R_5$ | $G_6$ | $R_7$ | $G_8$ | $R_9$ |
| $G_{10}$ | $B_{11}$ | $G_{12}$ | $B_{13}$ | $G_{14}$ |
| $R_{15}$ | $G_{16}$ | $R_{17}$ | $G_{18}$ | $R_{19}$ |
| $G_{20}$ | $B_{21}$ | $G_{22}$ | $B_{23}$ | $G_{24}$ |

*FIG. 5*

Blue

| $B_0$ | $G_1$ | $B_2$ | $G_3$ | $B_4$ |
|---|---|---|---|---|
| $G_5$ | $R_6$ | $G_7$ | $R_8$ | $G_9$ |
| $B_{10}$ | $G_{11}$ | $B_{12}$ | $G_{13}$ | $B_{14}$ |
| $G_{15}$ | $R_{16}$ | $G_{17}$ | $R_{18}$ | $G_{19}$ |
| $B_{20}$ | $G_{21}$ | $B_{22}$ | $G_{23}$ | $B_{24}$ |

*FIG. 6*

COLOR INTERPOLATION SYSTEM

BACKGROUND

The invention relates generally to image processing and particularly to techniques for interpolating colors detected by pixel sensors in imaging arrays.

Color imaging arrays may be used in a variety of electronic devices including digital cameras, copiers, scanners and the like. The array may itself be a charge coupled device (CCD), passive pixel sensor (PPS) or an active pixel sensor (APS) array.

Typical red, green, blue (RGB) imaging arrays sense red, green, and blue colors. While it is possible to intersperse a full set of red, green, and blue color sensors in one array, this has been found to be impractical. Thus, various arrangements have been developed to alternate sensors for the necessary colors through the array. Each sensor (in an RGB array) senses either red, green, or blue or in some embodiments, red, green1, green2, and blue. In still other embodiments, cyan, magenta, yellow (CMY) imaging arrays can be utilized. Thus, one sensor may sense a particular color, while an adjacent sensor may sense a different color. Thereafter, it is necessary to interpolate the missing color data for each pixel. Thus, if a given sensor is a red sensor in an RGB system, it may be desirable to interpolate color intensity data values for the green and blue colors at that sensor's location in order to produce a true representation of the image with sufficient color definition.

One conventional technique for determining an arrangement of pixels in an imaging array is called the Bayer pattern or the Bayer matrix. A pre-determined number of color sensors are arranged in what may be called a tile. A tile may be provided for each of three colors, e.g., red, green, and blue (as well as for green1 and green2 if desired). The Bayer pattern distributes the sensors for each color through the tile in a way that improves the interpolation process.

A variety of color interpolation techniques have been utilized. One problem with these techniques is that they may require relatively complex mathematical calculations which require correspondingly complex hardware implementations. This means that the imaging system is generally cumbersome and the speed of operation may be slow.

Thus, there is a continuing need for a color interpolation system with reduced computational complexity.

SUMMARY

In accordance with one embodiment, a method of analyzing image data from an array of pixel sensors includes calculating color intensity gradients between data from a center pixel sensor for a first color and sensors for the first color spaced from the center pixel sensor. A minimum gradient is then determined for a plurality of pixel gradients.

In accordance with another embodiment, a method of interpolating color values includes calculating color intensity gradients between data from a center pixel sensor for a first color and a pixel for the first color spaced from the center pixel sensor. The gradients are compared to a threshold value. If a gradient exceeds the threshold for that color, the intensity value of the center pixel sensor is used for a pixel spaced from said center pixel sensor.

BRIEF DESCRIPTION OF THE DRAWING

FIG. 1 shows a schematic representation of a group of pixels, illustrating a cross pattern within that group;

FIG. 2 shows a schematic depiction of a group of pixels illustrating a Celtic pattern within those pixels;

FIG. 3 shows a Bayer pattern or matrix for the color red;

FIG. 4 shows a Bayer pattern or matrix for the color green1;

FIG. 5 shows a Bayer pattern or matrix for the color green2;

FIG. 6 shows a Bayer pattern or matrix for the color blue;

DETAILED DESCRIPTION

Figure 7:
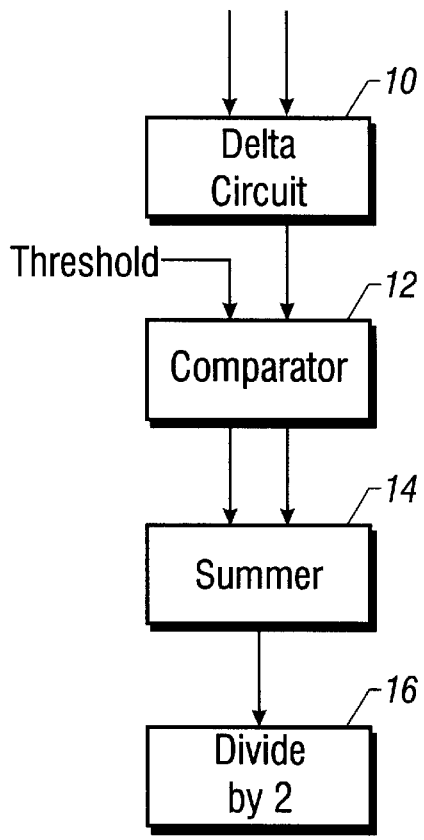
FIG. 7 is a block diagram showing a technique for determining a color threshold value.

A rectangular pattern of pixel data may be selected for color analysis and interpolation as shown in FIG. 1. In FIG. 1, a 5×5 array of data from 25 pixels has been selected with the individual pixels numbered 0 to 24.

A "cross pattern", shown in FIG. 1, includes the data from the pixels 2, 10, 12, 14, and 22. Similarly, a Celtic cross pattern, shown in FIG. 2, includes the data from pixels 0, 4, 12, 20, and 24. In both FIGS. 1 and 2, the center pixel is pixel number 12. A minimum color intensity gradient or delta from the center pixel may then be determined to aid with symmetry arbitration and to prevent over-averaging of high intensity delta boundaries. To determine the minimum cross delta, the intensity values of the pixels 2, 10, 14, and 22 are independently subtracted from the intensity value for the center pixel 12. Similarly, to determine the minimum Celtic delta, the intensity values for the pixels 0, 4, 20, and 24 are separately subtracted from the center pixel 12 intensity value. The minimum cross delta or (the minimum Celtic delta) may then be referred to as the minimum cross index (or the minimum Celtic index), followed by the non-center pixel number using the numbering sequence shown in FIGS. 1 and 2.

FIGS. 3 through 6 show a conventional-Bayer pattern or matrix. In the illustrated embodiment, both a green1 and a green2 tile of 25 pixels are utilized. However, a simple red, green, blue pattern may be utilized as well, and other color sequences such as cyan magenta and yellow (CMY) may also be used. With the convention used in FIGS. 3 through 6, the pixel position is shown as a subscript and the positions of the actual (non-interpolated) pixels corresponding to the given color are underlined. The other, non-underlined color values may be used in an interpolation algorithm so that the missing color values may be computed.

It is also advantageous to determine a simple average of the pixel intensity values for a given tile type. A tile type corresponds to the types shown in FIGS. 3 through 6 in the illustrated embodiment. Initially, a delta circuit 10, shown in FIG. 7, determines the deltas described above for the cross or Celtic configurations. The delta circuit 10 receives two inputs, one of which is the intensity value for the center pixel, and the other of which is one of the intensity values of the four surrounding pixels, as described above. The deltas are then analyzed to determine whether they are to be considered as "high" or "low" delta values. A greater than and less than comparator 12 determines whether a given delta determined by the circuit 10 is a minimum or maximum value in a given series of deltas. Each time a new minimum or maximum value is determined, it is used as the new threshold value for comparison to other values in the series. Minimum and maximum values, determined by the comparator 12, are then summed in a summer 14 and divided by two in the divider 16 to approximate a simple average.

The circuitry shown in FIG. 7 can be advantageous since averaging over twelve pixels would be hardware intensive, requiring the use of many adders in a multilevel network that require the divide function of twelve. The circuitry shown in FIG. 7 relies on a simple shift resulting in a considerably simpler hardware implementation.

Figure 8:
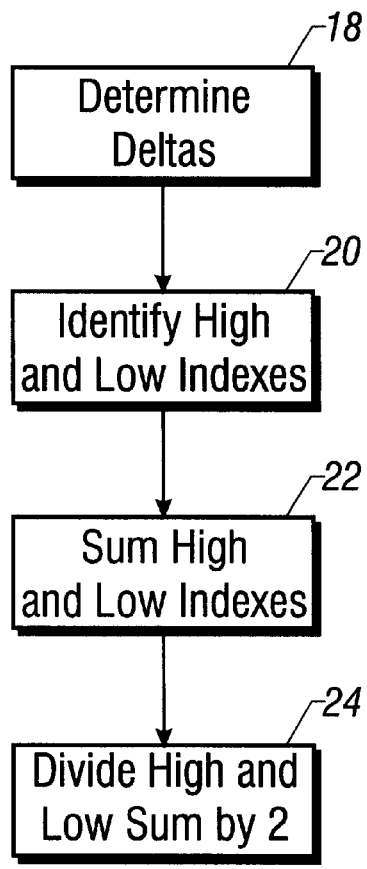
FIG. 8 is a flow chart for the hardware for determining a color threshold value shown in FIG. 7.

Referring to FIG. 8, a flow chart for implementing the embodiment shown in FIG. 1 involves determining the deltas, as indicated in block 18. The high and low deltas are then identified (block 20). The high and the low deltas are summed (block 22) and averaged (block 24).

For the tile type red (FIG. 3), the green threshold may be determined by the average (as described above) of the intensity values of the pixels 1, 3, 5, 7, 9, 11, 13, 15, 17, 19, 21, and 23. The blue threshold for the tile type red may be determined by the average of the intensity values of the pixels 6, 8, 16, and 18. For the tile type green1 (FIG. 4), the blue threshold is the average of the intensity value of the pixels 5, 7, 9, 15, 17, and 19. The red threshold for the tile type green1 is the average of the intensity values of the pixels 3, 13, 23, 21, 11, and 1. For the tile type green2 (FIG. 5), the red threshold is the average of the pixels 5, 7, 9, 15, 17, and 19. The blue threshold for the tile type green2 is the average of the pixels 3, 13, 23, 21, 11, and 1. Finally, for the tile type blue (FIG. 6), the green threshold is the average of the pixels 1, 3, 5, 7, 9, 11, 13, 15, 17, 19, 21, and 23. The red threshold for the tile type blue is the average of the pixels 6, 8, 16, and 18.

Figure 9:
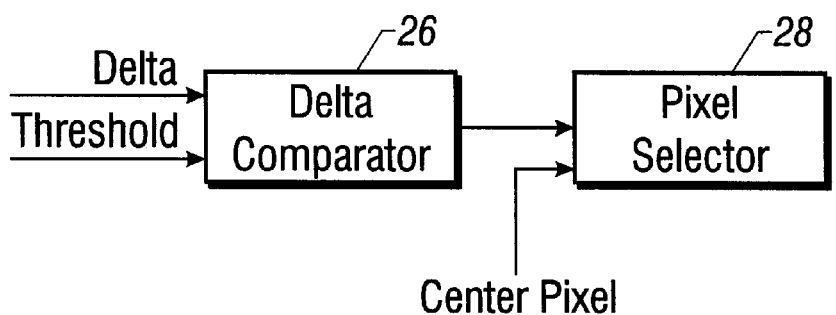
FIG. 9 is a block diagram showing a technique for determining a contrast threshold value.

As in any such system, some color anomalies may be caused by insufficient data with which to make an effective decision. These color anomalies may be aggravated and made more noticeable in high intensity black and white pattern areas with a great deal of pattern detail, close to or exceeding the Nyquist number. A fixed contrast threshold of 150 to 200 may be applied in parallel to the center pixel delta circuit 10. As shown in FIG. 9, a delta comparator 26 compares the delta in any given direction for the cross and Celtic configurations with a fixed contrast threshold. Any pixel gradient found to be greater than the contrast threshold results in that tile's color interpolation computation being defaulted to the center pixel intensity value, as indicated by the pixel selector 28. For example, in the case of a red tile found to have a delta greater than the contrast threshold, the subsequent interpolation of the green and blue colors would be replaced by the intensity value of the center pixel. This has the effect of washing out high intensity color variant detail which significantly improves anomalous clusters of "color bursts." Although it is feasible to compare the Celtic and cross configurations in all axes (i.e., in four directions), comparing only one axial direction may be equally effective with consequent reduction in hardware.

Figure 7A:
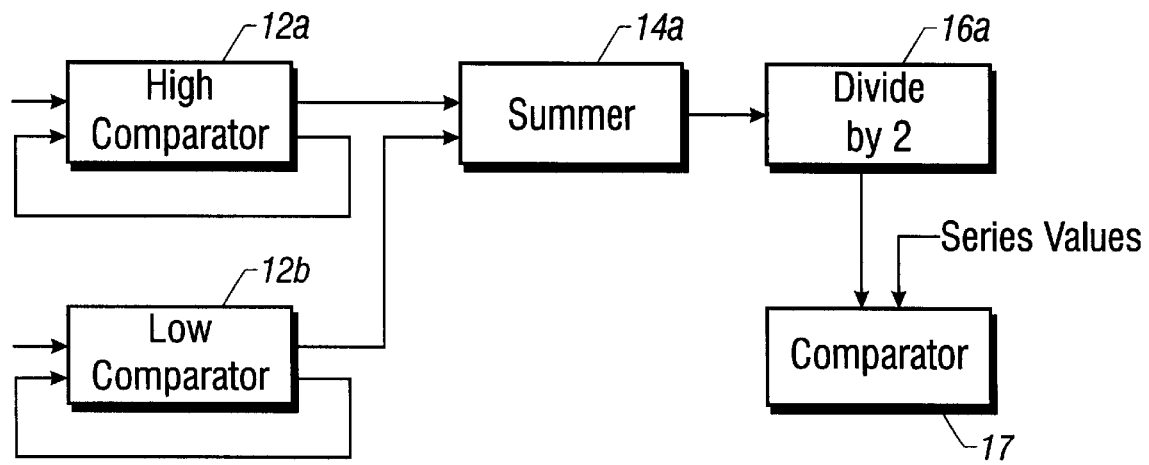
FIG. 7A is a block diagram showing a technique for checking color thresholds.
Figure 8A:
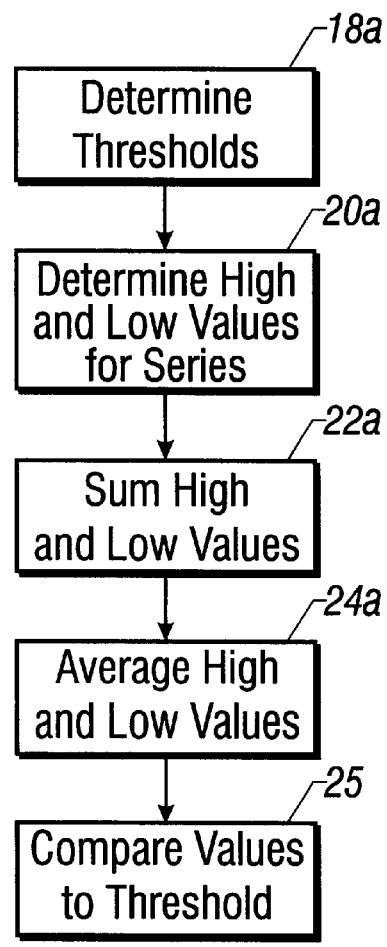
FIG. 8A is a flow chart for the hardware for checking color thresholds.

Thus, in one illustrative embodiment, color thresholds may be determined (block 18a) using the averages determined, as shown in FIG. 8A. Namely, the high and low values in the series are determined (block 20a), summed (block 22a) and averaged (block 24a). Referring to FIG. 7A, the high value in the series of intensity values may be determined by the comparator 12 which feeds back a new high value for comparison until the series is exhausted. Similarly, the comparator 12b feeds back a new low value until the series of intensity values is exhausted. Then, the series high and low values are output from the comparators 12a and 12b, summed in the summer 14a and averaged in the divide by two circuit 16a.

After computing the color threshold value of each color to be interpolated, each pixel is compared to that threshold as indicated in block 25 in FIG. 8A and by the comparator 17 in FIG. 7A. Thereafter, the pixel is regarded as either in high state (1) i.e. greater than or equal to the threshold, or the low state (0) i.e. less than the threshold. Once this comparison has been accomplished, standard digital logic may be used to detect patterns in the pixel array in the following fashion.

Figure 10:
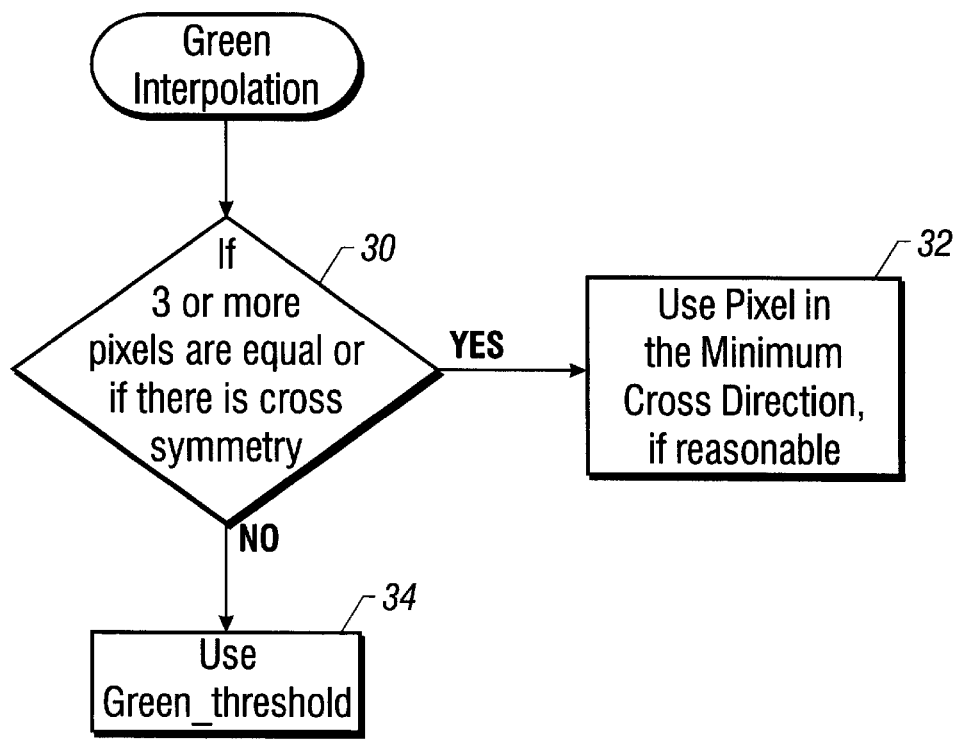
FIG. 10 is a flow chart showing a technique for green color interpolation.

Referring to FIG. 10, an exemplary green interpolation technique is illustrated for interpolation of green in a red or blue tile. Initially, if three or more pixels are the same state (i.e., all high or all low) or if there is cross symmetry, the pixel is chosen from a minimum cross direction, as illustrated in diamond 30 and block 32. An exception arises when the cross index is greater than the contrast threshold, in which case the interpolation value for the green center pixel is defaulted to be equal to the center color value (red or blue). There would be "cross symmetry" when, in the case of green interpolation, pixels 11 and 13 are the same state and pixels 7 and 17 are the same state but pixel 11 is not the same state as pixel 7.

It would not be reasonable to use the pixel in the minimum cross delta direction in certain cases. In the case of wall symmetries where pixels 7, 11, and 17 (FIG. 3) are the same state, for example, the minimum cross delta is utilized. But if the minimum cross delta suggests taking the data of the pixel farthest away from the perceived boundary, 13 in this example, then the minimum cross delta value is ignored and instead, the intensity value of one of the two pixels along the boundary is chosen.

If the tests set forth in the diamond 30 are not satisfied, the pre-calculated green threshold is utilized (block 34). Thus, if pixels 7 and 11 are the same and 17 and 13 are the same state, but pixel 11 is not the same state as pixel 17, the pre-calculated green threshold is used.

Figure 11:
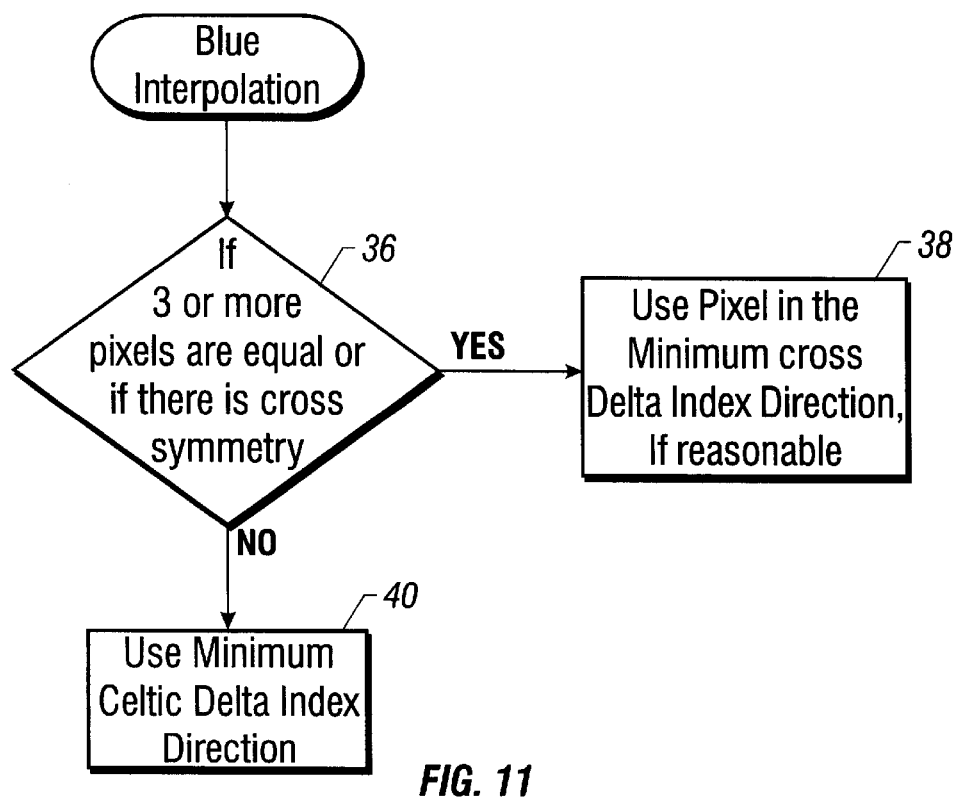
FIG. 11 is a flow chart showing a technique for blue color interpolation.

An exemplary blue interpolation, shown in FIG. 11, for interpolating blue in a red tile or red in a blue tile, generally corresponds to the green interpolation (using the blue or red values respectively). The same analysis is done in diamond 36 as was done in diamond 30 in the green interpolation. Similarly, the same analysis is done in block 38 in the blue interpolation, as was done in block 32 in the green interpolation. However, if the test of diamond 36 is not met, in this blue or red interpolation, the intensity value of the pixel in minimum Celtic delta direction is utilized (block 40).

Vertical wall symmetry occurs, for blue interpolation in a red tile, where pixel 16 equals pixel 6 and pixel 8 equals 18, but pixel 8 is not the same state as pixel 6. With vertical wall symmetry, if there is no obvious pattern of symmetry in the green pixels (11, 7, 17, 13), for example, all of the green pixels are the same state, the intensity value of the pixel in the minimum Celtic delta direction is used. However, if the green pixels confirm the wall symmetry (e.g., pixel 13 or pixel 11 in FIG. 3 is the same state as the left (6 and 16) or right wall (8 and 18), then the choice of pixels is constrained to a pixel from the appropriate side (i.e., the left or right vertical wall having the green pixel that confirms the wall symmetry) and the minimum Celtic delta is utilized. Similarly, with the horizontal wall symmetry where pixels 8 and 6 are the same state and the pixels 16 and 18 are the same state and the pixel 16 is not the same state as the pixel 6, the same technique is utilized.

Figure 12:
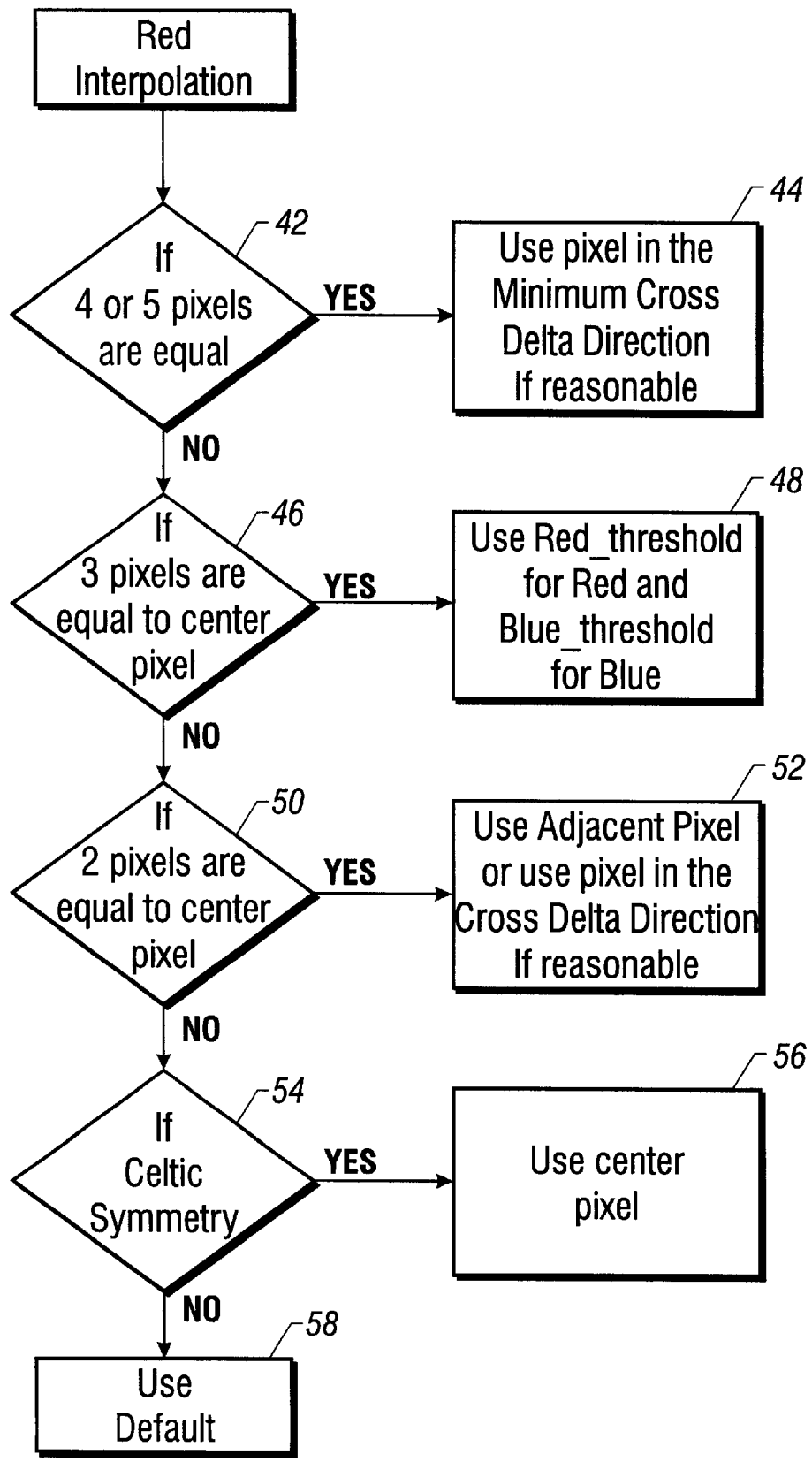
FIG. 12 is a flow chart showing a technique for red color interpolation.

Referring now to FIG. 12, an exemplary red or blue interpolation technique is illustrated in a green tile. In general, the green pixels are utilized to detect a pattern, and the choice of pixels is constrained to the two nearest neighboring red or blue pixels. The nearest neighbors would be one of pixels 7 or 17 in FIG. 4 (as opposed 5, 15, 9 or 19) in the case of the blue interpolation in green1. However, if symmetry is detected which is in conflict with this constraint, then the red threshold or the blue threshold is utilized.

If four or five pixels have equal states, as indicated in diamond 42, then the interpolation uses the intensity value of the pixel in the minimum cross delta direction if it is reasonable to do so (block 44). If five pixels (e.g., 6, 12, 18, 6, 16 in green1) are equal, the intensity value of the pixel in the direction of the minimum cross delta direction is utilized, but the choice must be constrained to the nearest neighbor red or blue pixels (either pixel 7 or 17 when interpolating for red in green2 tiles or pixels 11 or 13 when interpolating blue in green2 or red in green1 tiles). In the case where pixel 6 equals pixels 18, 16, and 8, the minimum cross delta is used to select the appropriate pixel intensity value, but the choice is constrained to either one of the two nearest neighbors.

Referring to diamond 46, if the state of three pixels are equal to the state of the center pixel, such as pixels 6, 8, 18 and 16 (FIG. 4) are the same state, then use the red threshold for red and the blue threshold for blue.

If two pixels are the same state as the center pixel, as indicated in diamond 50, then the adjacent pixel is used, or the pixel in the cross delta direction is used if reasonable (block 52). Thus, if pixel 6 is the same state as pixel 12 and 8 in the green1 tile, one interpolates for red as follows. If pixel 6 is the same state as pixels 12 and 16, then use the intensity value of pixel 11. If pixel 8 is the same state as pixels 14 and 18, then use the intensity value of pixel 13. In any other case, use the cross delta direction and constrain as before.

If there is Celtic symmetry as indicated in diamond 54, then the center pixel is utilized as indicated in block 56. Otherwise, a default value is utilized as indicated in block 58. Celtic symmetry is where pixels 6, 12, and 18 are the same state or pixels 8, 12, and 16 are the same state.

The last two pixels of each line can be interpolated simply by taking the thresholds from the computation of the previous 25-pixel frame. The last two pixels in the line are handled differently because it is not possible to position a tile around either of the last two pixels and stay within the array. The same is true of the last two lines. This may be done by using three additional flip-flops plus a counter to count pixels in the line.

The first two lines and the first two pixels of the third line maybe interpolated using the only data at the time of interpolation. That is, one or two lines may be used. If the averaging threshold circuits use comparators to determine the minimum and maximum, then they may be added and divided by 2. Then, providing the pipeline has been reset to zero, threshold values computed from the existing circuits are accurate.

While the present invention has been described with respect to a limited number of embodiments, those skilled in the art will appreciate numerous modifications and variations. It is intended that the appended claims cover all such modifications and variations as fall within the true spirit and scope of the present invention.

What is claimed is:

1. A method of analyzing image data from an array of pixel sensors comprising:

calculating color intensity gradients between data from a center pixel sensor for a first color and sensors for the first color spaced from the center pixel sensor;

determining a minimum gradient for a plurality of pixel gradients;

determining the highest and lowest intensity values for a series of intensity values for pixel sensors;

summing the high and low values;

averaging the high and low values;

comparing said average values to a threshold; and wherein if the average value exceeds the threshold, substituting a predetermined value for the intensity value of a pixel spaced from said center pixel sensor.

2. The method of claim 1 including calculating coloring intensity gradients for the first color along two transverse axes.

3. A method of claim 2, wherein the array includes rows and columns of pixel sensors, and said two transverse axes are aligned with the rows and columns of pixel sensors for calculating gradients.

4. The method of claim 2 wherein the array includes rows and columns of pixel sensors, and said axes are offset with respect to the rows and columns of pixel sensors for calculating gradients.

5. The method of claim 2 wherein the calculating step includes determining four color intensity gradients from each center pixel sensor.

6. The method of claim 1 including determining a maximum gradient for a plurality of pixel gradients.

7. The method of claim 6 further including summing the maximum and minimum gradients and averaging said maximum and minimum gradients.

8. The method of claim 1 wherein determining comprises determining the maximum and the minimum gradients, summing said maximum and minimum gradients and averaging said maximum and minimum gradients.

9. The method of claim 1 further including determining the highest and lowest intensity values for a series of intensity values for pixel sensors, summing the high and low values, and averaging the high and low values.

10. The method of claim 9 including comparing said averaged values to a threshold.

11. The method of claim 1 wherein if said gradient exceeds said threshold, using the center pixel sensor to define the intensity value of a pixel spaced from said center pixel sensor.

12. The method of claim 1 including using a Bayer matrix.

13. A method of analyzing image data from an array of pixel sensors comprising:

determining the maximum intensity value of data values from at least three different pixel sensors;

determining a minimum intensity value of data values from at least three different pixel sensors;

averaging the maximum and minimum intensity values;

comparing an average value to a threshold; and if the average value exceeds a threshold, substituting a predetermined value for the intensity value of a pixel spaced from a center pixel sensor.

14. The method of claim 13 including using a Bayer matrix.

15. A method of interpolating color values comprising:

calculating color intensity gradients between data from a center pixel sensor for a first color and a pixel for the first color spaced from the center pixel sensor;

comparing said gradients to a threshold value; and if a gradient exceeds said threshold for that color, using the intensity value of the center pixel sensor for a pixel spaced from said center pixel sensor.

16. The method of claim 15 including calculating said color intensity gradients in a tile for a first color and if said gradients exceed said threshold, replacing the interpolated values for two other color planes with the color value for the center pixel sensor.

17. The method of claim 15 further comprises determining said intensity gradients along transverse axes of an array of pixel sensors having rows and columns, where said transverse axes are aligned with said rows and columns of pixel sensors.

18. The method of claim 17 including only comparing said axes in one axial direction.

19. The method of claim 15 further comprises determining said color intensity gradients along axes of an array of pixel sensors having rows and columns, wherein said axes are offset.with respect to said rows and columns of pixel sensors.

20. The method of claim 19 including only comparing said gradients in one axial direction.

* * * * *